United States Patent [19]

Byrne

[11] Patent Number: 4,543,986

[45] Date of Patent: Oct. 1, 1985

[54] BALL CHECK VALVE AND PLATE

[76] Inventor: Thomas E. Byrne, P.O. Box 80123, Midland, Tex. 79709

[21] Appl. No.: 611,830

[22] Filed: May 18, 1984

[51] Int. Cl.$^4$ ............................................. F16K 15/04
[52] U.S. Cl. .............................. 137/515.7; 137/533.11; 137/533.13
[58] Field of Search ............ 137/515.7, 533.11, 533.13

[56] References Cited

U.S. PATENT DOCUMENTS

| 592,814 | 11/1897 | McCann | 137/53 |
| 1,530,317 | 3/1925 | Oamka | 137/533.11 |
| 2,317,278 | 4/1943 | Larson | 137/533.11 |

FOREIGN PATENT DOCUMENTS

| 619837 | 4/1927 | France | 137/533.13 |

Primary Examiner—Robert G. Nilson
Attorney, Agent, or Firm—Marcus L. Bates

[57] ABSTRACT

A ball check valve assembly for assuring unidirectional flow through a meter run. The valve assembly includes a plate member adapted to be placed between the confronting flanges of a pipeline or meter run and positioned so that back flow cannot occur back through the meter run. A passageway formed through the plate member extends into an enclosure which has a valve seat formed on the top wall surface thereof through which unidirectional flow can occur. One wall surface of the enclosure extends up and then bends towards the plate member. The marginal free end of the bent part of the back plate member is apertured to admit the ball to be received therein, thereby capturing the ball between the seat and aperture in a manner that enables the ball always to gravitate back into sealed relationship respective to the seat, and yet the ball can be displaced sufficiently far enough from the seat to achieve relatively unobstructed flow.

13 Claims, 6 Drawing Figures

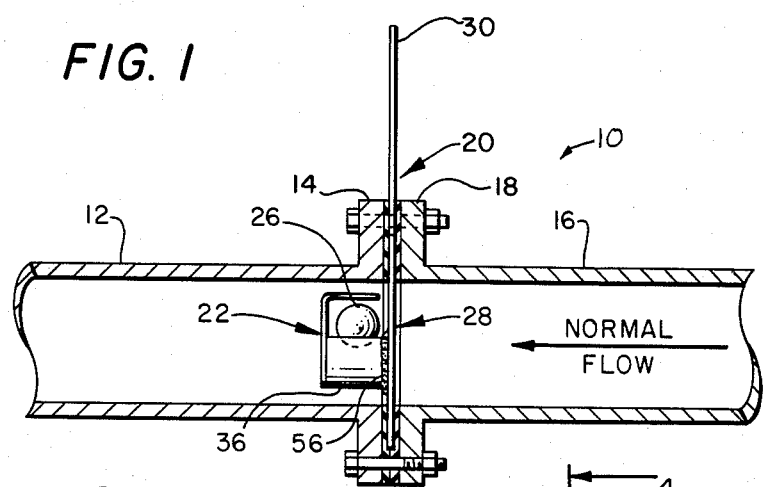
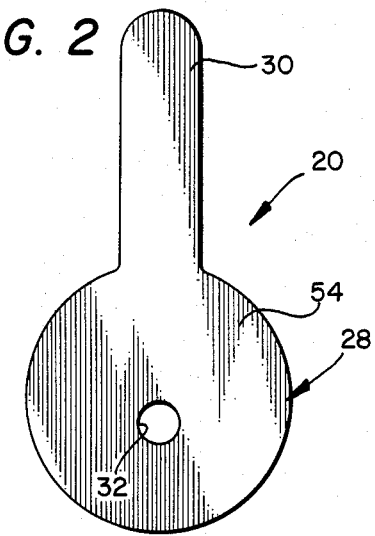
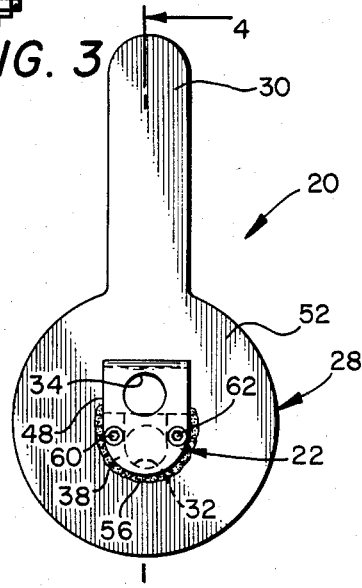
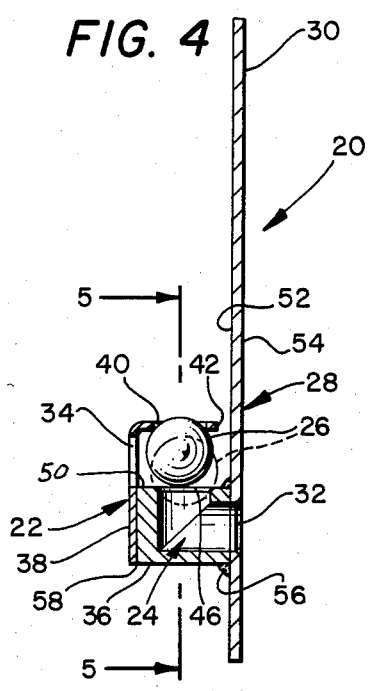
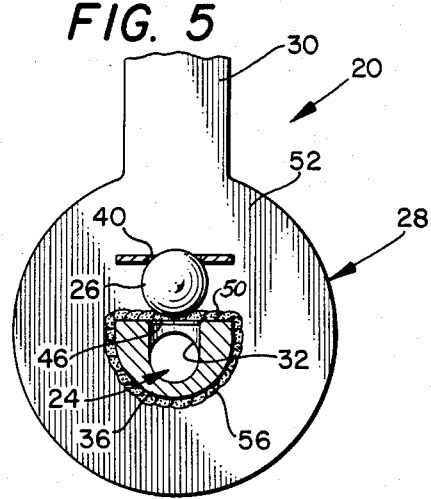

BALL CHECK VALVE AND PLATE

BACKGROUND OF THE INVENTION

Various different back flow valves have been proposed for use in flow lines, as evidenced by the following U.S. Pat. Nos.: 4,201,626 to Asdigian; 526,649 to Hallock; 780,786 to Dunham; 3,302,688 to Thrush; 2,330,468 to Brisbane, et al; 1,461,439 to Burgin; and 3,911,502 to Boretos.

However, the above prior art is not always satisfactory for use in a meter run, because of the expense or because the complicated nature of the valve. It would be desirable to have made available an inexpensive back flow valve having a minimum number of parts, and which positively gravitates back into seated position whenever back flow occurs. It would furthermore be desirable if such a valve could be interposed between confronting flange faces, thereby enabling the valve device to be used upstream or downstream of a meter run by utilizing the existing meter run flanges.

Apparatus which achieves the above desired goal and at the same time overcomes the objections of the prior art is the subject of the present invention.

SUMMARY OF THE INVENTION

A back flow valve apparatus for assuring unidirectional flow through a meter run. The valve apparatus is attached to a plate and can therefore be placed between the confronting flange faces where joints of pipe are made up especially at a meter run.

A passageway is formed through the plate member, and an enclosure has an entrance end affixed to the plate member at a location which encloses the passageway so that flow through the plate member must also proceed into the enclosure. The enclosure has an upper wall surface into which an outlet valve seat is formed. A back wall surface, which is attached to the free or far end of the enclosure, includes an extension which extends up above the enclosure and then curves towards the near side of the plate member and thereby is positioned in overlying relationship respective to a ball which is sealingly received by the seat. The overhanging wall extension is also apertured so that part of the ball can be received within the aperture of the wall extension. This arrangement of parts loosely captures the ball between the seat and wall extension so that the ball must always gravitate back into seated relationship respective to the valve seat upon reduced or back flow, and enables the ball to be displaced sufficiently from the seat to assure negligible pressure drop across the entire valve assembly.

In one form of the invention, the passageway is made eccentric respective to the geometrical center of the plate member, and the enclosure is curved in the appropriate parts to better conform to the interior of a pipe, so that the enclosure, ball, and overhanging wall surface can be received within a relatively small pipe.

A primary object of the present invention is the provision of an improved back flow valve for preventing back flow through a meter run.

Another object of the present invention is the provision of an improved check valve assembly having a minimum number of parts and made into a configuration which enables the valve part of the assembly to be snugly received within the interior of a small diameter pipe.

A further object of the invention is to provide a check valve assembly having a ball valve element which gravitates onto a valve seat located in a horizontal plane, and which is forced into seated relationship respective to a superimposed aperture spaced from the valve seat, thereby providing a captured ball having maximum displacement capability in a minimum space.

A still further object of this invention is to provide a check valve having a ball received against a seat formed externally of a contoured enclosure, wherein the valve is slidably received within a pipe, with the valve seat being formed in an upper wall of the enclosure, and with an apertured rear wall surface of the enclosure extending above the ball valve and loosely capturing the ball within the rear wall aperture in spaced relationship respective to the seat.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 1 is a longitudinal, part cross-sectional view of part of a pipeline having a check valve assembly made in accordance with the present invention associated therewith;

FIG. 2 is a front view of the valve assembly, made in accordance with the present invention;

FIG. 3 is a rear view of the apparatus disclosed in FIG. 2;

FIG. 4 is a side view of the apparatus disclosed in FIG. 2, with some parts thereof being cut away therefrom and some of the remaining parts being shown in cross-section;

FIG. 5 is a cross-sectional view taken along line 5—5 of FIG. 4; and,

DETAILED DESCRIPTION OF THE PREFERRED EMBODIMENT

Figure 6:
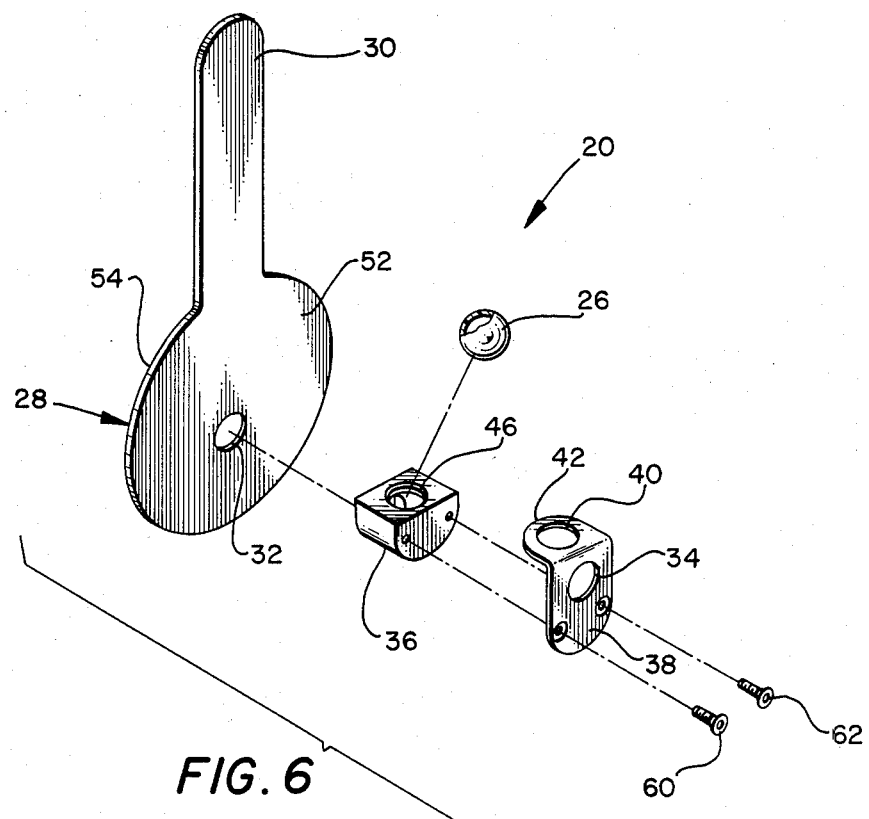
FIG. 6 is an exploded view which discloses further details of the present invention.

In FIG. 1, there is disclosed part of a pipeline generally indicated by the arrow at numeral 10. The joints of pipe 12 and 16 are affixed to flanges 14 and 18 in the usual manner. A ball check valve assembly 20, made in accordance with the present invention, has been inserted in sandwiched relationship between the confronting faces of flanges 14 and 18.

As seen disclosed in various figures of the drawings, the ball check valve of the present invention includes an enclosure 22 having an interior 24. A ball 26, preferably a spherical, light weight, nylon ball, available from Precision Plastic Ball Co., is seated at the upper extremity of the enclosure. A plate member 28, having a diameter of a suitable value to cooperate with the gasket associated with flanges 14 and 18, is held in fixed relationship between flanges 14 and 18. The plate 28 has an optional handle 30 extending therefrom.

Passageway 32 extends through plate member 28 and communicates with interior 24 of the enclosure 22. Aperture 34 is formed through an extended wall surface of rear wall member 38. Lower wall surface 36 of the enclosure preferably is curved, with the radius of curvature corresponding to the curvature of the inside surface of pipe 12. Aperture 40 is axially aligned respective to a valve seat 46. The rear wall surface 38 upwardly extends from the enclosure, is bent towards the adjacent face of the plate member, and terminates at edge portion 42. Edge portion 42 is spaced from the adjacent face or rear side 52 of the plate member. The opposed face or front side of the plate member is indicated by numeral 54. The valve seat is formed on the exterior of the upper wall surface 50. The enclosure has a fixed end 56, which preferably is attached to the adjacent face 52 of the plate member by welding. The enclosure has a free end 58, which includes the back plate 38. The back plate preferably is attached at the free end 58 of the enclosure by means of the illustrated fasteners 60 and 62, which preferably are small screws.

The back flow valve 20 of the present invention assures unidirectional flow through a meter run when the valve is placed either upstream or downstream of the meter run, so that flow occurs therethrough during normal operation, and flow therethrough is precluded when reverse flow occurs.

The aperture 40 preferably is about the same size and configuration of valve seat 46, so that ball valve 26 can be received therein and thereby displaced the maximum amount from the seat, while the overall size of the valve assembly is maintained a minimum value so that the entire assembly can be received within the interior of a pipe with a snug fit.

It is now evident that the valve assembly of this invention includes a plate member which is adapted to be placed between the confronting faces of a pair of adjacent flanges which may be associated with a pipeline. A passageway 32 is formed through the plate member and into the interior 24 of an enclosure. The enclosure has a fixed end 56 welded to the rear face 52 of the plate member, and a back wall 38 is attached to the free end 58 of the enclosure.

The back wall continues in an upward direction above the enclosure and curves towards the rear face of the plate member to bring the aperture 40 into axially aligned relationship respective to the valve seat 46, with the free marginal end of the wall extension lying close enough to the seat 46 to prevent dislodgment of the ball from captured relationship respective to the valve assembly.

When normal flow occurs through passageway 32 and into the interior 24 of the enclosure, the ball 26 rises into seated relationship respective to aperture 40, thereby providing ample space between the ball and seat through which fluid can flow. Should back flow occur, the ball is forced by the reverse flow to return into seated engagement with the valve seat and precludes flow from the back side to the front side of the plate, that is, precludes flow through passageway 32. Otherwise, with no flow, the ball gravitates onto the seat where it is positioned for another cycle of operation.

I claim:

1. A check valve for insertion between confronting adjacent flanges of a flow line, comprising:
a vertical plate member, a passageway formed through said plate member, an enclosure formed on one side of said plate member; said enclosure has a rear wall spaced from said plate member, sidewalls, a bottom wall, and a top wall, one end of said enclosure being attached to said plate member, said rear wall is affixed to and forms part of said enclosure; a valve seat formed in said top wall; the interior of said enclosure communicates with said aperture, a ball located externally of said enclosure of a size for seating on the valve seat; said rear wall extends above said seat and is bent towards said plate member and thereby captures the ball adjacent to the seat.

2. The check valve of claim 1 wherein the marginal free end of the bent rear wall is apertured to enable part of the ball to be received therein and thereby displaced further from its seat.

3. The check valve of claim 1 wherein the aperture in the plate is eccentric respective to the central axis of the plate member so that the enclosure, ball, and bent wall are centered respective to the center of the plate member.

4. The check valve of claim 1 wherein the marginal free end of the bent rear wall is apertured to enable part of the ball to be received therein and displaced further from its seat, and a second aperture is formed in the rear wall extension, through which flow can occur.

5. The check valve of claim 4 wherein the plate member aperture is eccentric respective to the central axis of the plate member so that the enclosure and ball is aligned respective to the center of the plate member.

6. A back flow valve for permitting unidirectional flow through a meter run, comprising:
a plate member adapted to be placed between confronting flanges of a pipeline associated with a meter run;
a passageway formed through said plate member, an enclosure having a fixed end and a free end, said fixed end is affixed to one side of the plate member and in aligned relationship respective to flow through said passageway so that flow through said passageway is conducted into said enclosure;
said enclosure has a top wall surface, a valve seat formed on the upper surface of said top wall surface, a ball valve adapted to be seated on said valve seat from a location externally of said enclosure;
said enclosure includes a rear wall surface at said free end of said enclosure so that flow through said passageway is forced only through said seat; said rear wall surface extends up above said enclosure and bends towards the plate member into overlying relationship respective to said ball and seat and thereby loosely captures the ball in a manner that permits the ball to be displaced from its seat and thereafter gravitates back onto said seat.

7. The back flow valve of claim 6 wherein the marginal free end of the bent rear wall is apertured to enable part of the ball to be received therein and thereby displaced further from its seat.

8. The back flow valve of claim 6 wherein the aperture in the plate is eccentric respective to the central axis of the plate member so that the enclosure, ball, and bent wall are centered respective to the center of the plate member.

9. The back flow valve of claim 6 wherein the marginal free end of the bent rear wall is apertured to enable part of the ball to be received therein and displaced further from its seat, and a second aperture is formed in the rear wall extension, through which flow can occur.

10. A check valve for preventing backflow through a meter run by insertion of the check valve between confronting adjacent flanges upstream or downstream of the meter run, said check valve comprising:
a flat plate member, a flow passageway formed perpendicularly through said plate member, means forming an enclosure on one side of said plate member; said enclosure has an inner wall surface including a rear wall, sidewalls, a bottom wall, and a top wall; means by which one end of said enclosure is attached to said plate member, said rear wall is spaced from said plate member and is affixed to and forms part of said enclosure; means forming a valve seat in said top wall; the interior of said enclosure communicates with said passageway and said valve seat, a ball means is loosely captured externally of said enclosure, said ball is of a size for seating in sealed relationship respective to said valve seat; said rear wall includes a marginal free end which extends above said seat and then curves towards said plate member, said marginal free end is apertured to enable part of the ball to be received therein and thereby enables the ball to be displaced further from its seat; so that the marginal end of the rear wall is positioned to capture the ball respective to the seat.

11. The check valve of claim 10 wherein the flow passageway in the plate member is eccentric respective to the central axis of the plate member so that the enclosure, ball, and curved wall are centered respective to the center of the plate member.

12. The check valve of claim 10 wherein a second aperture is formed in the bent rear wall at a location above the enclosure so that part of any flow can occur therethrough.

13. The check valve of claim 11 wherein the plate member aperture is eccentric respective to the central axis of the plate member so that the enclosure and ball is aligned respective to the center of the plate member.

* * * * *